(No Model.)
G. E. HOOD & C. W. TIFT.
Cotton Seed Planter and Guano Distributer.
No. 238,590. Patented March 8, 1881.
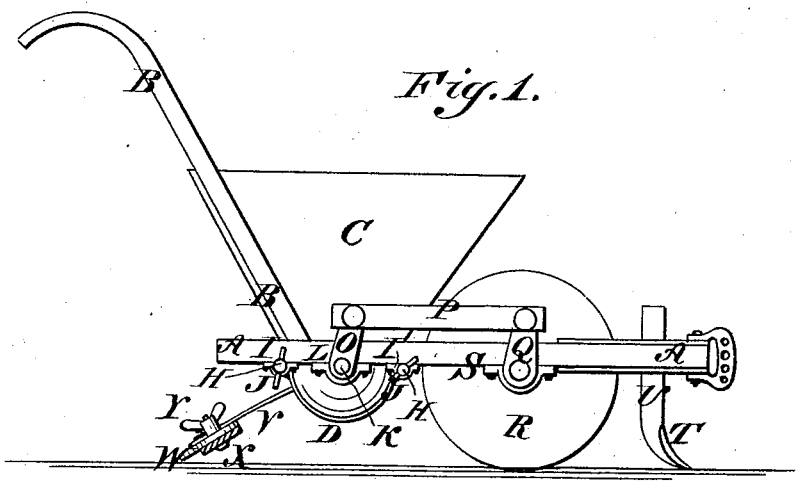
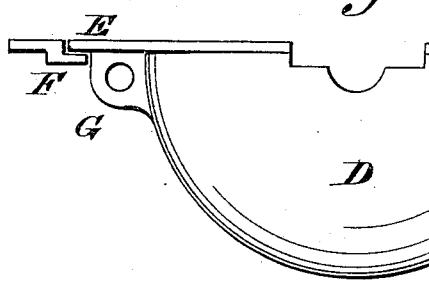
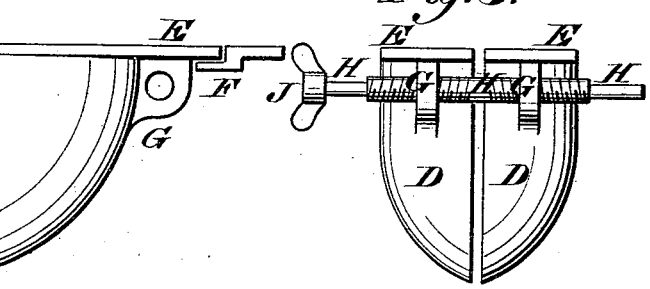
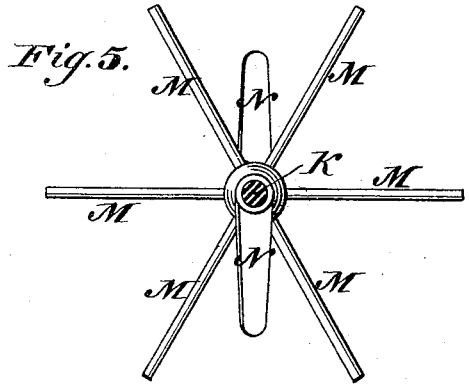
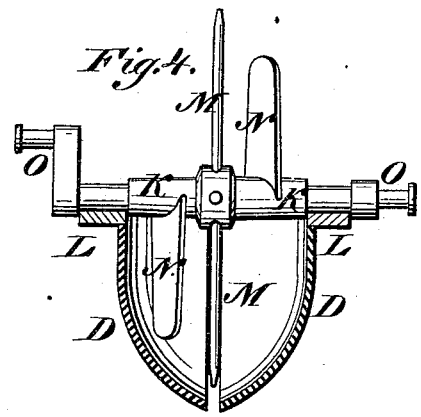
WITNESSES:
Donn P. Twitchell.
C. Sedgwick
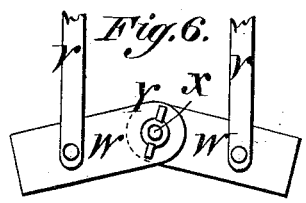
INVENTOR:
G. E. Hood
C. W. Tift
BY Munn & Co
ATTORNEYS.

UNITED STATES PATENT OFFICE.

GREEN E. HOOD AND CHARLES W. TIFT, OF ALBANY, GEORGIA.

COTTON-SEED PLANTER AND GUANO-DISTRIBUTER.

SPECIFICATION forming part of Letters Patent No. 238,590, dated March 8, 1881.

Application filed November 8, 1880. (No model.)

*To all whom it may concern:*

Be it known that we, GREEN E. HOOD and CHARLES W. TIFT, of Albany, in the county of Dougherty and State of Georgia, have invented a new and useful Improvement in Cotton-Seed Planters and Guano-Distributers, of which the following is a specification.

Figure 1 is a side elevation of the improvement. Fig. 2 is a side elevation of the seed-receptacle and its supporting-lugs. Fig. 3 is an end elevation of the seed-receptacle and its adjusting-screw. Fig. 4 is a sectional elevation of the seed-receptacle, showing the feed mechanism in front view. Fig. 5 is a side elevation of the feed mechanism. Fig. 6 is a plan view of the coverer.

Similar letters of reference indicate corresponding parts.

The object of this invention is to furnish cotton-seed planters and guano-distributers so constructed that they can be readily adjusted to plant more or less seed, or distribute more or less guano, and to cover the seed to a greater or less depth, as may be required.

A represents the frame of the machine, to the forward end of which the draft is applied, and to its rear part are attached the handles B.

To the rear part of the frame A, between and in front of the handles B, is attached the hopper C, which is made without a bottom.

Beneath the hopper C, and serving as a bottom to the said hopper, is placed the receptacle D, which is made in the form of a flattened half-sphere, and in two equal parts, as shown in Figs. 2, 3, and 4. The parts of the receptacle D are formed of cast-iron or other suitable material, and have flanges E cast upon their ends, to rest upon lugs F attached to cross-bars of the frame A, or upon rabbets or flanges of the said cross-bars, so that the said parts can be adjusted farther apart or closer together, according as more or less cotton-seed is to be planted or guano or other fine fertilizer is to be distributed.

Upon the ends of the parts of the receptacle D, and below the flanges E, are cast lugs G, which have screw-holes formed through them to receive the screws H. The screws H are swiveled in bearings I attached to the frame A, and are made with right and left screw-threads, as shown in Fig. 3, so that the parts of the receptacle D can be moved from or toward each other equally by turning the said screws H in one or the other direction, and thus keep the central line of the discharge-opening always in the same vertical plane.

To the ends of the swiveled screws H are attached cross-head handles J, for convenience in turning them.

K is a shaft, which is placed in the center of the circle of which the curve of the receptacle D is a part, and revolves in bearings L attached to the frame A.

To the center of the shaft K, or to a hub attached to the said shaft, are attached radial arms M, of such a length as to sweep through or close to the inner circumference of the opening between the adjacent edges of the parts of the receptacle D, so as to force the cotton-seed or guano out through the said opening.

To the opposite sides of the shaft K, and upon the opposite sides of the radial arms M, are attached two radial wings or paddles, N, which are made flat, and are attached to the shaft K with their rear edges inclined inward, so that as the shaft K revolves the said wings N will sweep through the side parts of the receptacle D and press the cotton-seed or fertilizer toward the opening between the ports of the said receptacle D, and thus into proper position to be forced out by the radial arms M.

To the projecting ends of the shaft K, at the outer sides of the frame A, are attached two cranks, O, which project at right angles with each other, as shown in Fig. 4, so that the said cranks can never become set upon their dead-points.

To the cranks O are pivoted the rear ends of two connecting-bars, P, the forward ends of which are pivoted to the cranks Q, attached to the ends of the journals of the drive-wheel R, which cranks Q also stand at right angles with each other. The journals of the drive-wheel R revolve in bearings S attached to the frame A. The wheel R runs in the furrow opened by the plow T, and by its revolution operates the feed mechanism K M N to discharge the cotton-seed or guano. The plow T is attached to the lower end of the standard U, which passes up through a slot in the frame A, and is secured in place by wedge-keys, bolts, or other suitable means.

To the rear part of the frame A are attached the forward ends of two drag-bars, V, to the rear ends of which are pivoted, by bolts or rivets, the middle parts of two short boards, plates, or blocks, W. The inner ends of the boards W overlap each other, and are secured to each other by a bolt, X, and hand-nut Y, so that by loosening the nut Y the boards W can be adjusted at a greater or less angle with each other, to cause them to cover the seed to a less or greater depth, as circumstances may require.

Having thus described our invention, we claim as new and desire to secure by Letters Patent—

In a seed-planter, the hopper having a bottom formed of two equal concaved pieces, D, supported adjustably with respect to each other by means of flanges E and nut-lugs G on said pieces D, the frame-lugs F, and the screws H, swiveled to frame, as and for the purpose specified.

GREEN ELLIS HOOD.
CHARLES WARD TIFT.

Witnesses:
TAM E. JAMES,
ROBT. P. HALL.